United States Patent
Chen et al.

(10) Patent No.: US 7,573,887 B2
(45) Date of Patent: Aug. 11, 2009

(54) SYSTEM AND METHOD FOR PROVIDING RSVP RESERVATIONS IN A SHARED LINE ENVIRONMENT

(75) Inventors: Rongxuan V. Chen, San Jose, CA (US); Subhasri Dhesikan, San Jose, CA (US); John K. Restrick, Jr., Palo Alto, CA (US); Scott A. Henning, Plano, TX (US); Christopher E. Pearce, Dallas, TX (US); Martin W. Wu, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 593 days.

(21) Appl. No.: 11/047,795

(22) Filed: Jan. 31, 2005

(65) Prior Publication Data

US 2006/0171309 A1    Aug. 3, 2006

(51) Int. Cl.
*H04L 12/28* (2006.01)
*H04L 12/56* (2006.01)
*H04L 12/26* (2006.01)
*H04J 3/18* (2006.01)

(52) U.S. Cl. .................. 370/395.2; 370/230; 370/400; 370/401; 370/477

(58) Field of Classification Search ................ 370/229, 370/230.1, 270, 477, 468, 432
See application file for complete search history.

(56) References Cited

U.S. PATENT DOCUMENTS

| 6,031,841 | A | 2/2000 | Woundy | 370/410 |
|---|---|---|---|---|
| 6,101,549 | A | 8/2000 | Baugher et al. | 709/238 |
| 6,366,577 | B1 | 4/2002 | Donovan | 370/352 |
| 6,385,207 | B1 | 5/2002 | Woundy | 370/410 |
| 6,519,254 | B1 | 2/2003 | Chuah et al. | 370/389 |
| 6,621,793 | B2 | 9/2003 | Widegren et al. | 370/230.1 |
| 6,683,870 | B1* | 1/2004 | Archer | 370/356 |
| 6,721,272 | B1 | 4/2004 | Parnafes et al. | 370/235 |
| 6,765,927 | B1 | 7/2004 | Martin et al. | 370/469 |
| 6,931,028 | B1* | 8/2005 | Hock | 370/477 |
| 7,068,632 | B1* | 6/2006 | Ho et al. | 370/338 |
| 7,099,333 | B2* | 8/2006 | Baker et al. | 370/395.5 |
| 7,221,672 | B2* | 5/2007 | Ollis et al. | 370/352 |
| 7,272,134 | B2* | 9/2007 | Iwama et al. | 370/352 |
| 7,281,043 | B1* | 10/2007 | Davie | 709/226 |
| 2003/0154488 | A1* | 8/2003 | Strater et al. | 725/95 |
| 2003/0223431 | A1* | 12/2003 | Chavez et al. | 370/395.42 |
| 2006/0045132 | A1* | 3/2006 | Metke | 370/477 |

OTHER PUBLICATIONS

Internetworking Technologies Handbook (3rd edition), Cisco Press, 2001, p. 48-8-48-9.*

(Continued)

*Primary Examiner*—Daniel J Ryman
*Assistant Examiner*—Cassandra Decker
(74) *Attorney, Agent, or Firm*—Baker Botts L.L.P.

(57) ABSTRACT

An apparatus for communicating data in a shared line environment is provided that includes a first reservation element operable to communicate with a second reservation element. The first reservation element is associated with a first location and the second reservation element is associated with a second location. A call may be initiated between the first location and the second location, the second location having one or more end-user devices that share a common line. The first reservation element is operable to reserve bandwidth associated with a connection that involves the first location and the second location before the call occurs.

22 Claims, 3 Drawing Sheets

OTHER PUBLICATIONS

R. Braden et al., RFC-2205: Resource ReSerVation Protocol (RSVP), Network Working Group, Sep. 1997, pp. 1-10.*

PCT Notification of Transmittal of the International Search Report and the Written Opinion of the International Searching Authority, or the Declaration with attached PCT International Search Report and Written Opinion of the International Searching Authority in International Application No. PCT/US06/02454, dated Jan. 25, 2006, (9 pages).

* cited by examiner

SYSTEM AND METHOD FOR PROVIDING RSVP RESERVATIONS IN A SHARED LINE ENVIRONMENT

TECHNICAL FIELD OF THE INVENTION

This invention relates generally to communications and, more particularly, to a system and a method for providing RSVP reservations in a shared line environment.

BACKGROUND OF THE INVENTION

The field of communications has become increasingly important in today's society. In particular, the ability to quickly and to effectively interact with an individual (through any suitable communications media) presents a significant obstacle for component manufacturers, system designers, and network operators. This obstacle is made even more difficult due to the plethora of diverse communication technologies that exist in the current marketplace.

As new communication platforms become available to the consumer, new protocols need to be developed in order to optimize these emerging technologies. For example, some problems often encountered in any communications environment relate to the limited availability of bandwidth. This may be particularly problematic in the case of shared line devices (i.e. one or more devices that share a directory number such that when the directory number is dialed, several devices would ostensibly ring). The deficiency in properly accommodating shared line devices may cause certain calls to fail, or cause bandwidth to be erroneously assigned to certain connections that will not be utilized. Accordingly, the ability to adequately service shared line devices presents an obstacle for any employee, employer, individual, or endpoint that seeks to execute successful communication sessions.

SUMMARY OF THE INVENTION

From the foregoing, it may be appreciated by those skilled in the art that a need has arisen for an improved process that provides an effective solution for participants in a communications architecture. In accordance with an embodiment of the present invention, a system and a method for providing a reservation functionality are provided that substantially eliminate or greatly reduce disadvantages and problems associated with conventional communication strategies and protocols.

According to an embodiment of the present invention, an apparatus for communicating data in a shared line environment is provided that includes a first reservation element operable to communicate with a second reservation element. The first reservation element is associated with a first location and the second reservation element is associated with a second location. A call may be initiated between the first location and the second location, the second location having one or more end-user devices that share a common line. The first reservation element is operable to reserve bandwidth associated with a connection that involves the first location and the second location before the call occurs.

Certain embodiments of the present invention may provide a number of technical advantages. For example, according to one embodiment of the present invention, an architecture and a process are provided that avoids incorrectly reserving a surplus bandwidth that is not needed. In addition, in the proffered architecture, calls do not fail in cases where there is more than enough bandwidth in a location to accommodate the call. The present invention further allows any communications platform to optimize RSVP reservations for shared line devices and, thus, reduces the number of RSVP reservations required. The present invention significantly limits the chances of having an RSVP reservation failure.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
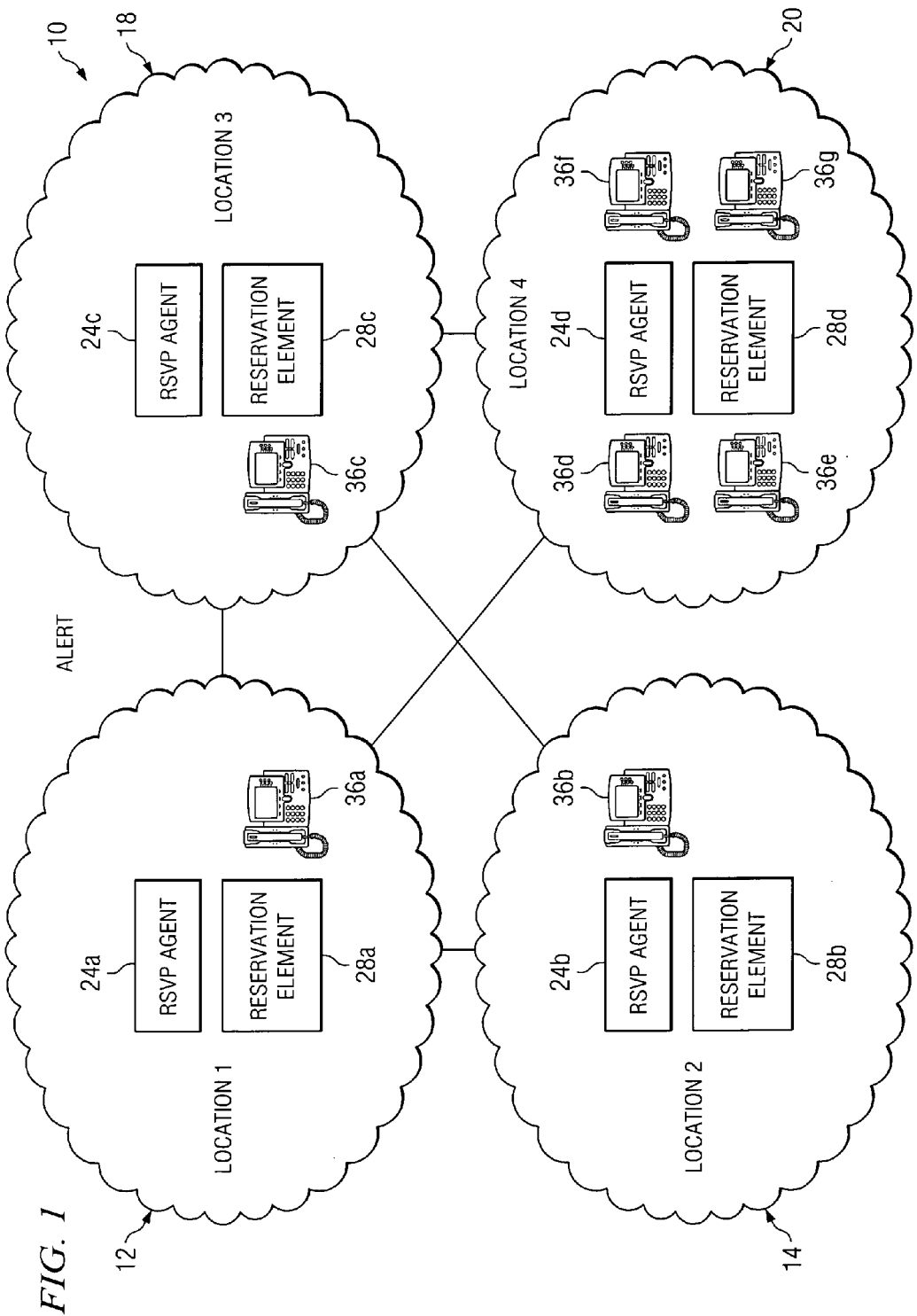
FIG. 1 is a simplified block diagram illustrating a communication system that may implement a reservation feature in accordance with one embodiment of the present invention.

FIG. 1 is a simplified block diagram of a communication system 10 for implementing a reservation feature, which can optimize communications, in any suitable environment (e.g. a session initiation protocol (SIP) environment). Communication system 10 includes multiple Locations (#1-#4) 12, 14, 18, and 20: each of which may include a respective RSVP agent (24a-d) and a reservation element (28a-d). Each Location 12, 14, 18, and 20 may include one or more end-user devices (36a-g), whereby if more than one device is present at a given Location then a shared-line configuration may be present. Additional details related to each Location are provided below.

In accordance with the teachings of the present invention, communication system 10 offers a new reservation technology service that optimizes the reservation for shared line devices. This reduces the number of RSVP reservations required for a given system and, further, limits the chance of reservation failure. Communication system 10 offers a process that avoids reserving bandwidth that is not needed. Communication system 10 provides an architecture in which calls do not fail where there is more than enough bandwidth in a location to accommodate the call. The present invention further allows any communications platform to optimize RSVP reservations for shared line devices and, thus, reduces the number of RSVP reservations required. This limits the chances of having a reservation failure.

For purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

In a distributed enterprise telecommunication system, shared line devices can be located across multiple Locations/sites, where multiple shared line devices are provided in a single Location/site. When a call is terminated to the shared line directory number, all devices sharing the same line/directory number will invoke a reservation individually, and subsequently rely on the network to combine/merge the RSVP reservation. The problem occurs when multiple bandwidth reservations have occurred in a shared line call because the reservations may fail if multiple bandwidths are not available.

RSVP agents 24a-d can serve as the RSVP proxy for those devices that need to invoke an RSVP reservation, but that lack the ability to do so by themselves. When RSVP agents are deployed in the distributed communication network, devices can utilize the RSVP agent, which is generally co-located in the same Location/site, to invoke an RSVP reservation.

Communication system 10 offers a new method to optimize the RSVP reservation (e.g. using RSVP agents and reservation elements) for the shared line devices. This capability would allow a single reservation to be utilized by multiple shared line devices within the same Location/site and, thereby, reduce the bandwidth required. This would, in turn, reduce the chances of a reservation failure.

When a call is terminating to a shared line/directory number, all the shared line-terminating devices that are located in the same Location/site, and that support the same bandwidth requirement, can share the same RSVP agent resource. This allows these devices to share the same reservation initiated by a given RSVP agent, which is co-located with those terminating devices. Other devices that share the same line/directory number, but that are located in different Locations/sites, can allocate their RSVP agents and have their own reservation respectively. The calling party device will only allocate one RSVP agent resource and create one too many (one calling party device to multiple shared line terminating devices located in several Locations/sites) RSVP reservations.

A given communications platform (e.g. the Call Manager platform manufactured by Cisco Systems, Inc. of San Jose, Calif.) can create an object to monitor and keep track of the reservation relationship so that proper RSVP agent resource allocation and RSVP reservations are recorded. The communications platform may also prevent potential resource and bandwidth leakage. When one of the shared line devices answers the call, all other RSVP reservations and RSVP agent resources are released.

When the shared line device that answers the call places the call on hold, the RSVP reservation, which is initiated and maintained by the RSVP agent on behalf of the communications platform, is not released. Thus, if the same shared line device (or any another device that shared the same line and that is located in same Location/site) resumes the call, the reservation is ready to be utilized. This reduces the time to setup the new reservation and also limits the chance that the RSVP bandwidth that is not available for the resumed call. In a case where another device shared the same line, but was located in a different Location/site, and the call was resumed, then a new reservation can be initiated by the RSVP agent that is co-located with the new called party device. In such an instance, the old RSVP reservation, which was associated with the device that placed the call on hold, can be released.

In the context of an example, which demonstrates a generic shared line dilemma, consider a case where a conventional "help-desk" is configured to have eight phone lines (e.g. eight individuals are answering these lines in order to answer customer questions associated with a given consumer product). In this example, all eight lines have the same phone number. Hence, when the number is dialed, eight phones ring and when a party at the help-desk answers the call, all lines stop ringing. In such a scenario, it is not necessary to reserve bandwidth for eight calls. Only bandwidth for one call should be reserved because only one person will be participating in a single call with the customer who called into the help desk. By incorrectly reserving bandwidth in this case, some calls may be rejected when there was not enough bandwidth to allow the call to go through.

The present invention overcomes this issue, and others, by making a reservation to one intermediate device (e.g. RSVP agent 24a-d and/or reservation element 28a-d). If that is successful, then all the phones would ring normally, whereby the one phone that answers the call uses the single reservation that was made.

Locations 12, 14, 18, and 20 each represent a series of points or nodes of interconnected communication paths for receiving and transmitting packets of information that propagate through communication system 10. Locations 12, 14, 18, and 20 may communicate with each other or with other devices and Locations where appropriate. Each of Locations 12, 14, 18, and 20 may offer some service or capability to a given end user (or set of end users, who may be accessing some type of device (e.g. IP telephones 36a-g) at the respective Locations. In some cases, Locations 12, 14, 18, and 20 simply offer connectivity or phone service for their clients or customers. Locations 12, 14, 18, and 20 may be coupled to one or more additional network elements (e.g. service provider networks, where appropriate).

Locations 12, 14, 18, and 20 may offer a communications interface between a given end user and a requested destination (e.g. another end user). Locations 12, 14, 18, and 20 may be any suitable architecture, such as a local area network (LAN), an enterprise network, a virtual private network (VPN), a metropolitan area network (MAN), or a wide area network (WAN) or any other appropriate architecture or system that facilitates communications.

Each Location 12, 14, 18, and 20 may include one or more end-user devices. End users are clients or customers seeking to initiate or to establish a communication tunnel, link, or session in communication system 10 via Locations 12, 14, 18, and 20. In one embodiment, each Location is equipped with one or more IP telephones, which serve as end-user devices 36a-g. It should be noted that certain Locations include several IP telephones, which are provided in order to explain the shared line applications of the present invention. In alternative embodiments, end-user devices 36a-g could include any elements used to initiate a communication, such as a computer, a personal digital assistant (PDA), a laptop, or an electronic notebook, any type of telephone, a mobile station, or any other device, component, element, or object capable of initiating voice or data exchanges within communication system 10. These devices may or may not be SIP-enabled. Each of these devices may also be inclusive of a suitable interface to the human user, such as a microphone, a display, a keyboard, or other terminal equipment.

Each Location 12, 14, 18, and 20 may also include a respective RSVP agent 24a-d, along with a respective reservation element 28a-d. These elements may readily be combined into a single unit where appropriate and based on particular needs. In other embodiments, either or both of these elements may be provided external to the respective Location.

Each RSVP agent 24a-d may easily accommodate a real-time protocol (RTP), a user datagram protocol (UDP) or any other appropriate type of communication. Audio and video conferences can also be readily accommodated by RSVP agents 24a-d. Each RSVP agent 24a-d may also perform appropriate transcoding operations, where appropriate. In more particular embodiments, reservation elements 28a-d (and/or RSVP agents 24a-d) could be (or be part of) switches, gateways, bridges, voice-mail servers, routers, loadbalancers, music-on-hold servers, and videoconferencing architectures. These operate as front-ends to each respective Location. Between Locations, numerous pieces of network equipment (not shown) may be present (e.g. routers, switches, WAN-links, etc.). A call leg (i.e. a signaling path) may be created by any one of RSVP agents 24a-d. The call signaling may propagate along this path and implicate reservation elements 28a-d in any suitable fashion.

It should be noted that the internal structure of Locations 12, 14, 18, and 20 are malleable and can be readily changed, modified, rearranged, or reconfigured in order to achieve their intended operations as they pertain to the reservation function. Computer readable media, software and/or hardware may reside in RSVP agents 24a-d and/or reservation elements 28a-d in order to achieve the teachings of the reservation feature of the present invention. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (FEPROM), field-programmable gate array (FPGA), or any other suitable element or object that is operable to facilitate the operations thereof. Considerable flexibility is provided by the structure of RSVP agents 24a-d and reservation elements 28a-d in the context of communication system 10 and, accordingly, should be construed as such. In one 30 embodiment, such a feature is only provided in one of these elements, whereby the other element may simply leverage this tool as needed.

Additionally, the present invention has applicability to a plethora of devices and platforms. Any device that the RSVP agent can communicate with can benefit from the teachings of the reservation feature. Thus, a given agent may be placed in front of the associated device and provide the reservation function as outlined herein. Example devices could be associated with H.323, Skinny (i.e. skinny call control protocol (SCCP), media gateway control protocol (MGCP), CTI (which is an API that can control the PBX or soft switch), SIP, etc. or any other suitable protocol or technology.

Figure 2:
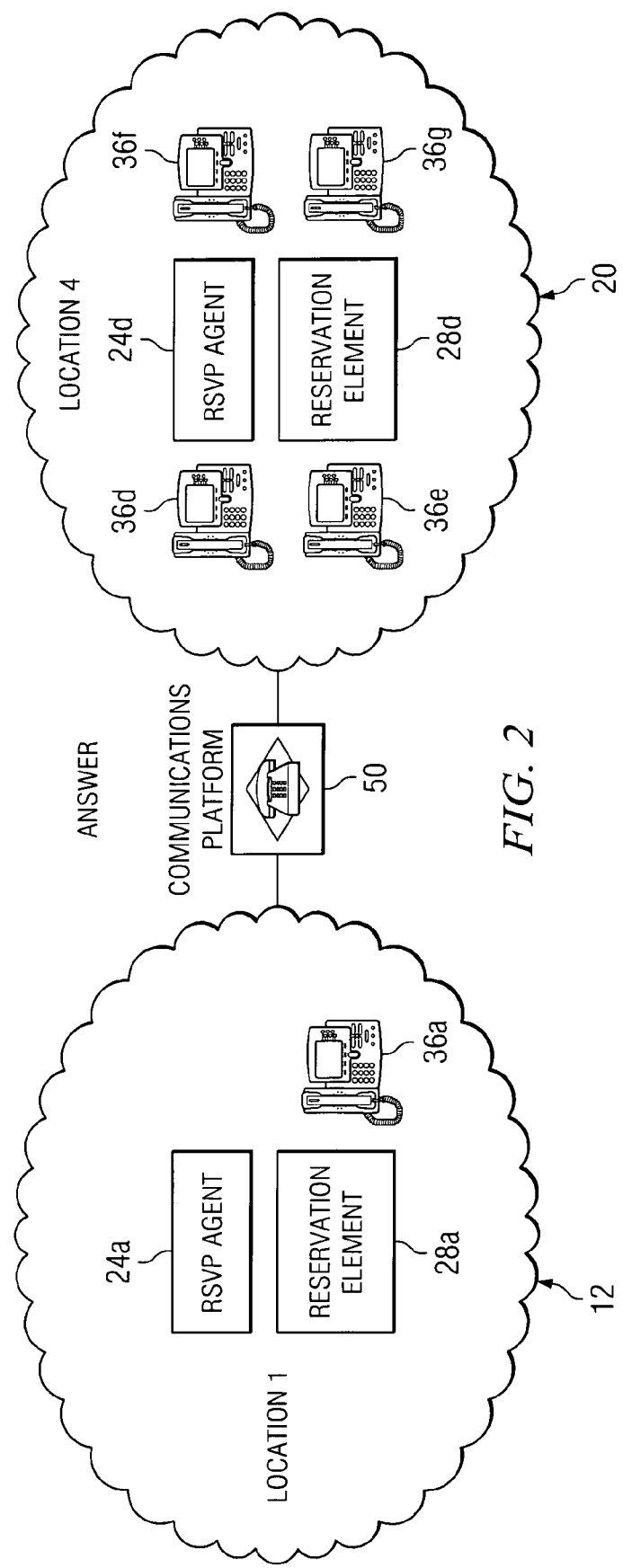
FIG. 2 is a simplified block diagram that illustrates an example operational flow of the communication system of FIG. 1.

FIG. 2 is a simplified block diagram that offers one example scenario in which a shared line scenario occurs. FIG. 2 includes Locations 12 and 20. For shared line calls, if multiple terminating devices are in the same Location, it is desirable that those terminating devices can share the same RSVP agent resource. For shared line calls, a new reservation can be initiated between the calling device and the terminating shared line device if that device is in a different Location than other terminating shared line devices.

Consider an example in which user A (from Location 12) calls user B (from Location 20), who is configured with a shared line, which is shared amongst four parties (i.e. for IP telephones), that provide for a mandatory RSVP policy. In this example, RSVP reservations succeed for two terminating devices, and these endpoints are alerted (i.e. the line rings). Two out of the four are not alerted. User B associated with one of the two successful calls answers the call and the alert for the other ceases. The two phones that were never alerted will "see" that there is a call on the shared line but they never heard their phone ring.

Note that the general problem is how to guarantee that the bandwidth, which is needed for the call, is available in the network before connecting the parties associated with the call. In an IP network, this dilemma is even more challenging because there are no static, rigid, all-accommodating trunks. Hence, a determination as to the pathway between two endpoints needs to be made first, whereby a subsequent bandwidth evaluation may also be executed. RSVP, as a technology, can be used to make appropriate reservations between two devices.

In operation of an example embodiment, consider a case where a caller initiates a given call. A corresponding RSVP agent recognizes the number, as the RSVP agent knows several devices that share this number. However, prior to ringing these phones, the RSVP agent is configured such that it first ensures that enough bandwidth is present before attempting the connection. The RSVP agent at the caller site may then make a reservation with the potential receiving RSVP agents. A given reservation element may be implicated in this scenario. The reservation element may reserve enough bandwidth for the one call. When the RSVP agents are coordinated such that they confirm that there is enough bandwidth to accommodate the call, then a communications platform (e.g. the Call Manager) can then ring the two selected phones. In addition, in the case of multiple telephones at a given Location, the other reservation will be completed between the two RSVP agents and the other phones can then ring. When a particular phone is answered, the other reservation(s) may be released because such bandwidth is no longer needed. Media, from the caller to the callee, may then be routed through the calling RSVP agent such that the media will follow the path that was reserved. The callee RSVP agent will then receive the media and forward that on to the person for which it was intended.

Note that the task of requesting the reservation could be made by any number of elements. For example, RSVP agents 24a-d could perform this function, as well as communications platform 50 or even endpoints (e.g. computers or telephones provided as end-user devices 36a-g). Considerable flexibility is provided by the present invention in executing the reservation feature as identified herein. In this regard, this invention may operate with standard telephones, which have been equipped with RSVP agents to facilitate the bandwidth reservation operations of the present invention. It should also be noted that there are other items (many of which can exist on the path between two reservation elements) that provide answers to requests. When using RSVP, these are the routers or switches that have RSVP turned ON in the path between the two elements.

Figure 3:
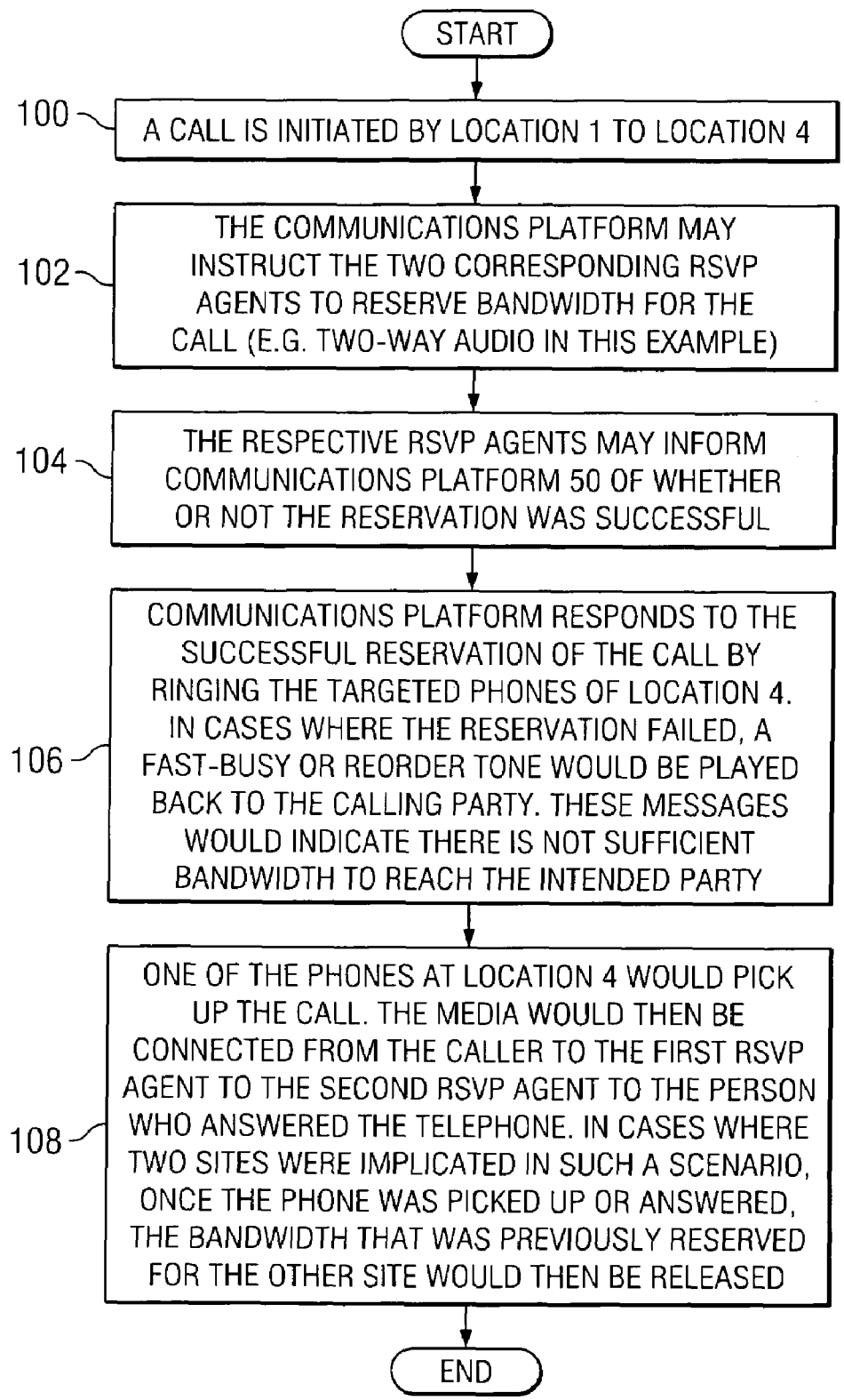
FIG. 3 is a simplified flowchart illustrating an operation of the system of FIG. 1 according to some of the teachings of the invention.

Yet another example operation is illustrated by the embodiment of FIG. 3. FIG. 3 is a simplified flowchart of an example operation of communication system 10. In this example, Location 1 is initiating a call and Location 4 is receiving the call. The Skinny phone and the SIP phone of Location 4 share a line (i.e. a directory number (DN)) in this scenario. At step 100, a call is initiated by Location 1 to Location 4. Communications platform 50 may instruct the two corresponding RSVP agents to reserve bandwidth for the call (e.g. two-way audio in this example). This is illustrated at step 102. Note that this instruction may be performed by the RSVP agents autonomously or provided by any reservation element 28a-d.

At step 104, the respective RSVP agents may inform communications platform 50 of whether or not the reservation was successful. At step 106, communications platform 50 responds to the successful reservation of the call by ringing the targeted phones of Location 4. In cases where the reservation failed, a fast-busy or a reorder tone would be played back to the calling party. These messages would indicate there is not sufficient bandwidth to reach the intended party.

At step 108, one of the phones at Location 4 would pick up the call. The media would then be connected from the caller to the first RSVP agent to the second RSVP agent to the person who answered the telephone. In cases where two sites were implicated in such a scenario, once the phone was picked up or answered, the bandwidth that was previously reserved for the other site would then be released.

Note that in an example hold/resume call flow, where phones A, B, and C are present, and where B and C are sharing the same DN, then the following would occur. When C resumes the call, if B and C are in the same Location, then communications platform 50 (e.g. the Call Manager) may reuse the reservation between A and B for a call between A and C. If B and C are in different Locations, then communications platform 50 may need to allocate an RSVP agent for C, and attempt a reservation in parallel to connecting A to C.

It is important to note that the stages and steps in FIG. 3 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing reservation functions.

Although the present invention has been described in detail with reference to particular embodiments, it should be understood that various other changes, substitutions, and alterations may be made hereto without departing from the spirit and scope of the present invention. For example, the illustrated network architecture of FIG. 1 has only been offered for purposes of example and teaching. Suitable alternatives and substitutions are envisioned and contemplated by the present invention: such alternatives and substitutions being clearly within the broad scope of communication system 10. Additionally, communication system 10 is not tied to RSVP systems, as reservation elements 28*a*-*d* can easily cooperate with other platforms. The RSVP protocols (and RSVP agents) have only been provided for purposes of example and teaching.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method for communicating data in a shared line environment, comprising:
   communicating, by a first reservation element, with a second reservation element, the first reservation element associated with a first location, the second reservation element associated with a second location, the second location having a plurality of second end-user devices that share a common line;
   initiating a call from the first location to the second location using the common line; and
   making a single reservation for the plurality of second end-user devices sharing the common line to initiate ringing at the plurality of second end-user devices sharing the common line, the single reservation for the plurality of second end-user devices sharing the common line reserving bandwidth sufficient to make only one connection between the first location and the second location.

2. The method of claim 1, further comprising:
   communicating with the first and second reservation elements; and
   providing an instruction to reserve the bandwidth for the call.

3. The method of claim 1, further comprising:
   informing a communications platform of whether or not the bandwidth reservation was successful.

4. The method of claim 1, further comprising:
   ringing the second end-user devices of the second location if the bandwidth reservation was successful.

5. The method of claim 1, further comprising:
   reusing the bandwidth reservation in a hold and resume scenario involving the second location.

6. The method of claim 1, further comprising:
   determining that a particular second end-user device has answered the call;
   connecting media from a first end-user device to the particular second end-user device that answered the call.

7. The method of claim 1, comprising:
   communicating, by the first reservation element, with a third reservation element, the third reservation element associated with a third location and having a plurality of third end-user devices that share the common line with the plurality of second end-user devices of the second location;
   making a reservation for the plurality of third end-user devices sharing the common line to initiate ringing at the plurality of third end-user devices sharing the common line, the reservation reserving bandwidth sufficient to make only one connection between the first location and the third location;
   releasing, in response to determining that a particular second end-user device answered the call, the reservation made for the plurality of third end-user devices of the third location.

8. An apparatus for communicating data in a shared line environment, comprising:
   a first reservation element configured to:
      communicate with a second reservation element, the first reservation element associated with a first location, the second reservation element associated with a second location, the second location having a plurality of second end-user devices that share a common line;
      initiate a call from the first location to the second location using the common line; and
      make a single reservation for the plurality of second end-user devices sharing the common line to initiate ringing at the plurality of second end-user devices sharing the common line, the single reservation for the plurality of second end-user devices sharing the common line reserving bandwidth sufficient to make only one connection between the first location and the second location.

9. The apparatus of claim 8, further comprising:
   a first RSVP agent operable to communicate with the first reservation element, wherein the first RSVP agent is operable to communicate with a second RSVP agent in order to facilitate the call.

10. The apparatus of claim 8, further comprising:
    a first end-user device, wherein the first reservation element is operable to interface with the first end-user device that participates in the call.

11. The apparatus of claim 8, further comprising:
    a communications platform operable to communicate with the first and second reservation elements and to provide an instruction to reserve the bandwidth for the call.

12. The apparatus of claim 11, wherein the communications platform may be informed of whether or not the bandwidth reservation was successful.

13. The apparatus of claim 12, wherein if the bandwidth reservation was successful, the communications platform responds by ringing the second end-user devices of the second location.

14. The apparatus of claim 11, wherein the communications platform may reuse the bandwidth reservation in a hold and resume scenario involving the second location.

15. The apparatus of claim 8, wherein once a particular one of the second end-user devices at the second location answers the call, media is connected from a first end-user device to the particular second end-user device that answered the call.

16. The apparatus of claim 8, wherein the first reservation element is configured to:

communicate with a third reservation element, the third reservation element associated with a third location and having a plurality of third end-user devices that share the common line with the plurality of second end-user devices of the second location;

make a reservation for the plurality of third end-user devices sharing the common line to initiate ringing at the plurality of third end-user devices sharing the common line, the reservation reserving bandwidth sufficient to make only one connection between the first location and the third location;

release, in response to determining that a particular second end-user device answered the call, the reservation made for the plurality of third end-user devices of the third location.

17. A computer readable medium for communicating data in a shared line environment, the computer readable medium comprising computer code such that when executed is operable to:

communicate, via a first reservation element, with a second reservation element, the first reservation element associated with a first location, the second reservation element associated with a second location, the second location having a plurality of second end-user devices that share a common line;

initiate a call from the first location to the second location using the common line; and make a single reservation for the plurality of second end-user devices sharing the common line to initiate ringing at the plurality of second end-user devices sharing the common line, the single reservation for the plurality of second end-user devices sharing the common line reserving bandwidth sufficient to make only one connection between the first location and the second location.

18. The medium of claim 17, wherein the code is further operable to:

communicate with the first and second reservation elements; and provide an instruction to reserve the bandwidth for the call.

19. The medium of claim 17, wherein the code is further operable to:

inform a communications platform of whether or not the bandwidth reservation was successful.

20. The medium of claim 17, wherein the code is further operable to:

respond by ringing the second end-user devices of the second location if the bandwidth reservation was successful.

21. The medium of claim 17, wherein the code is further operable to:

reuse the bandwidth reservation in a hold and resume scenario involving the second location.

22. The medium of claim 17, wherein the code is operable to:

communicate, by the first reservation element, with a third reservation element, the third reservation element associated with a third location and having a plurality of third end-user devices that share the common line with the plurality of second end-user devices of the second location;

make a reservation for the plurality of third end-user devices sharing the common line to initiate ringing at the plurality of third end-user devices sharing the common line, the reservation reserving bandwidth sufficient to make only one connection between the first location and the third location;

release, in response to determining that a particular second end-user device answered the call, the reservation made for the plurality of third end-user devices of the third location.

* * * * *

UNITED STATES PATENT AND TRADEMARK OFFICE
CERTIFICATE OF CORRECTION

PATENT NO. : 7,573,887 B2 Page 1 of 1
APPLICATION NO. : 11/047795
DATED : August 11, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this

Seventh Day of September, 2010

David J. Kappos
*Director of the United States Patent and Trademark Office*